(12) United States Patent
    Wideman

(10) Patent No.: US 9,343,100 B2
(45) Date of Patent: May 17, 2016

(54) MEDIA LIBRARY SYSTEM AND METHOD FOR MONITORING CHANGES IN INVENTORY OF MEDIA CARTRIDGES

(75) Inventor: Roderick B. Wideman, Shakopee, MN (US)

(73) Assignee: QUANTUM CORPORATION, San Jose, CA (US)

( * ) Notice: Subject to any disclaimer, the term of this patent is extended or adjusted under 35 U.S.C. 154(b) by 1279 days.

(21) Appl. No.: 12/218,775

(22) Filed: Jul. 17, 2008

(65) Prior Publication Data

US 2010/0014179 A1    Jan. 21, 2010

(51) Int. Cl.
| G06F 13/00 | (2006.01) |
| G06F 13/28 | (2006.01) |
| G11B 15/68 | (2006.01) |
| G11B 17/22 | (2006.01) |

(52) U.S. Cl.
    CPC .......... *G11B 15/6835* (2013.01); *G11B 17/225* (2013.01)

(58) Field of Classification Search
    None
    See application file for complete search history.

(56) References Cited

U.S. PATENT DOCUMENTS

| 6,178,529 | B1 * | 1/2001 | Short et al. ..................... 714/51 |
| 6,286,079 | B1 * | 9/2001 | Basham et al. ............... 711/112 |
| 6,693,539 | B2 * | 2/2004 | Bowers et al. ............ 340/572.1 |
| 2007/0106697 | A1 * | 5/2007 | Amarendran et al. ..... 707/104.1 |
| 2009/0282461 | A1 * | 11/2009 | Haustein et al. ................. 726/2 |

* cited by examiner

*Primary Examiner* — Eric S Cardwell
(74) *Attorney, Agent, or Firm* — Roeder & Broder LLP; James P. Broder

(57) ABSTRACT

A method for monitoring changes in an inventory of media cartridges in a media library includes the steps of determining with a controller that the inventory of media cartridges in the media library has changed, and asynchronously reporting with the controller the specific change in inventory of media cartridges that has occurred in the media library. The method can also include the step of determining whether the change in inventory included an increase or a decrease in the quantity of media cartridges within the media library, or whether the change in inventory did not include an increase or decrease in the quantity of media cartridges within the media library. Further, the method can also include the step of determining whether the change in inventory of media cartridges is required to be reported. A media library system includes a media library having a plurality of media cartridges, and a controller that determines a change in an inventory of media cartridges in the media library. In certain embodiments, the controller asynchronously and selectively reports a specific change in the inventory of media cartridges in the media library.

45 Claims, 4 Drawing Sheets

MEDIA LIBRARY SYSTEM AND METHOD FOR MONITORING CHANGES IN INVENTORY OF MEDIA CARTRIDGES

BACKGROUND

Data security has become an ever increasing concern for data centers that rely on media, such as tape cartridges, virtual tape cartridges and other types of media stored in media storage libraries. In response to this concern, various mechanisms and technologies have been developed in an attempt to improve data security. For example, encryption of data is used to deter this type of security breach.

Another aspect of data security is controlling access to the data stored on the media. Controlling access to the media includes the need to detect and/or closely monitor such access. In the case of an automated data storage library such as a tape library, detection and monitoring of access can be extremely challenging because many libraries are made to facilitate insertion and removal of media from the library. This inherent conflict between the desire for rapid and easy transfer of cartridges in and out of the library and the need for limiting such transfers has been difficult to resolve. Consequently, users and controllers of media libraries can become particularly troubled over the complexity of preventing unauthorized movement, i.e. insertion or removal, of media cartridges from a media library.

Attempts to provide notification that a library has been accessed, i.e. door opened or closed, mailbox opened or closed, etc., have been not altogether satisfactory for determining unauthorized movement of media cartridges. For example, systems that utilize SCSI "unit attentions" or "standard sense data" can be insufficient for a useful level of security for several reasons. First, these notifications may only be provided in response to subsequent commands to the library, e.g., a polled event. Further, an inadequate level of specification is provided with respect to whether any media was added or removed. In addition, in the event media is removed, no identification of which media was affected is directly made available. Moreover, these events are provided to a backup application rather than an administrator or user of the library. Therefore further delays in notification may result.

SUMMARY

The present invention is directed toward a method for monitoring changes in an inventory of media cartridges in a media library. In one embodiment, the method includes the steps of determining with a controller that the inventory of media cartridges in the media library has changed, and asynchronously reporting with the controller the specific change in inventory of media cartridges that has occurred in the media library. In certain embodiments, the method includes the step of determining whether the change in inventory included an increase or a decrease in the quantity of media cartridges within the media library. In another embodiment, the method includes the step of determining whether the change in inventory of media cartridges is required to be reported.

In accordance with one embodiment, the step of determining whether the change in inventory is required to be reported includes bypassing reporting of a change in inventory if the change in inventory is initiated by a command to export or import one of the media cartridges. In another embodiment, the step of determining whether the change in inventory is required to be reported includes reporting the change in inventory if the change in inventory is not initiated by a command to export or import one of the media cartridges. In one embodiment, the step of determining whether the change in inventory is required to be reported includes reporting the change in inventory if the change in inventory occurs to a selected subset of media cartridges within the media library. Further, the step of determining whether the change in inventory is required to be reported can include reporting the change in inventory if the change in inventory occurs during a predetermined period of time. In one embodiment, the step of determining whether the change in inventory is required to be reported includes reporting the change in inventory if the change in inventory occurred while an unauthorized user is logged in to a system that at least partially controls the media library. Alternatively, the step of determining whether the change in inventory is required to be reported includes reporting the change in inventory if the change in inventory occurred following a power up of a system that at least partially controls the media library.

In certain embodiments, the method also includes the step of assessing the inventory following the occurrence of an event. Further, the event can include one or more of opening or closing of a mailbox of the media library, powering up of the media library, and/or opening or closing of a door of the media library. In another embodiment, the method includes the step of comparing the inventory following the event with the assessment of the inventory prior to the event. In one embodiment, the step of asynchronously reporting includes the controller sending a simple network management protocol (SNMP) trap notification, an electronic mail notification and/or a Storage Management Initiative-Specification (SMI-S) indication. Moreover, the step of asynchronously reporting can include reporting a time that the change in inventory in the media library was determined and/or a location of the change in inventory in the media library.

The present invention is also directed toward a media library system that includes a media library including a plurality of media cartridges, and a controller that determines a change in an inventory of media cartridges in the media library. In certain embodiments, the controller asynchronously and selectively reports a specific change in the inventory of media cartridges in the media library.

BRIEF DESCRIPTION OF THE DRAWINGS

The invention, together with further advantages thereof, may best be understood by reference to the following description taken in conjunction with the accompanying drawings, taken in conjunction with the accompanying description, in which similar reference characters refer to similar parts, and in which.

DESCRIPTION

Figure 1A:
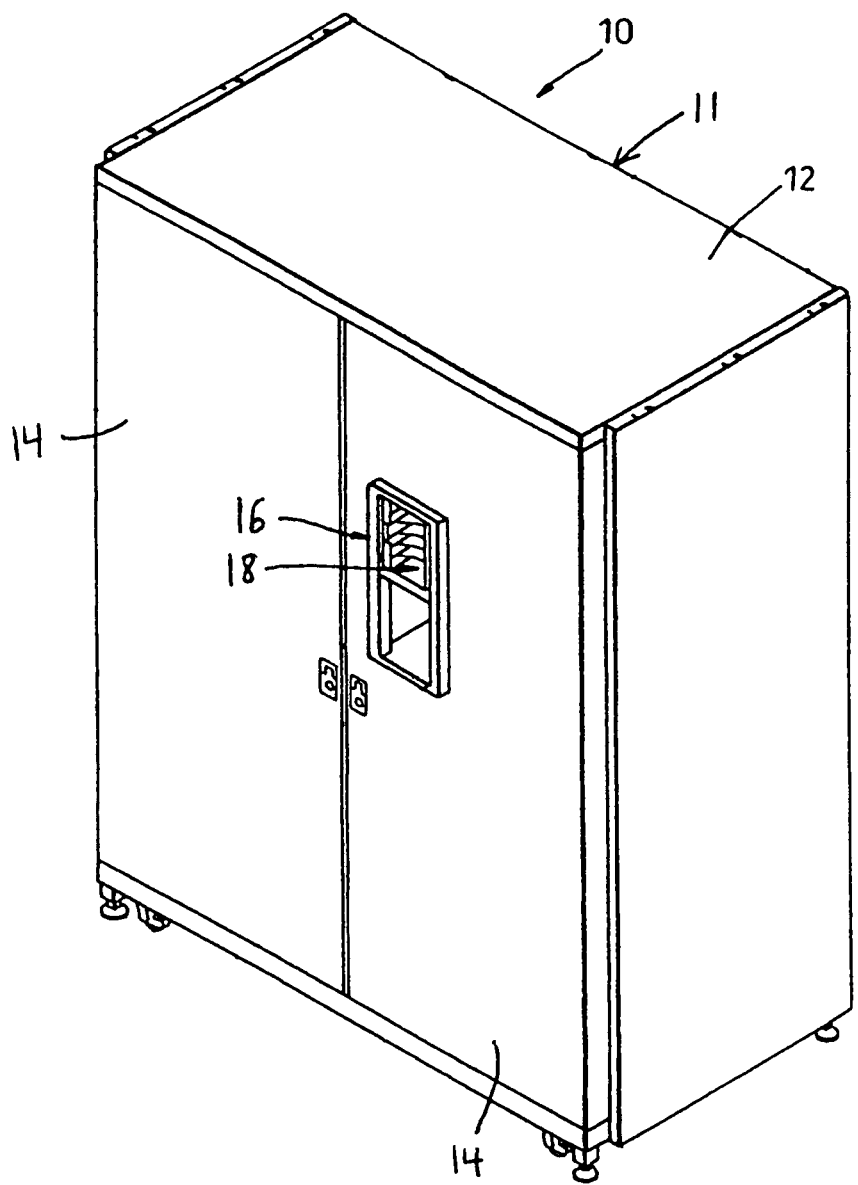
FIG. 1A is a simplified perspective view of one embodiment of a media library system having features of the present invention, including a media library illustrated in a closed position.

FIG. 1A is a simplified schematic view of one embodiment of a media library system 10. In the embodiment illustrated in FIG. 1A, the media library system includes one media library 11, illustrated in a closed position. However, it is recognized that the media library system 10 can include a plurality of media libraries 11 that are in communication with one another, and/or that are simultaneously or selectively monitored, as more fully described below. In the embodiment illustrated in FIG. 1A, the media library 11 is in the form of a multi-drive, mass storage and retrieval tape library/loader unit. It is understood that although the media library 11 illustrated and described relative to FIG. 1A is a tape library 11 that houses tape cartridges, this is for ease of description and understanding of the system only. It is recognized that the media library system 10 herein can equally apply to other types of media libraries that include, but are not limited to, optical drives, disk drives, any other suitable removable media type of media library 11, or a combination of two or more of these types of media libraries 11. In other words, discussion of the specific tape library 11 as shown and described herein is not intended to limit the scope of the media library system 10 in any manner.

In one embodiment, the media library 11 includes a housing 12 having one or more doors 14 and a mailbox 16 having one or more mail slots 18. The size and shape of the housing 12, the number, size and/or orientation of the doors 14, and the size and specific design of the mailbox 16 can each vary depending upon the design requirements of the media library 11. The housing 12 may be constructed of any number and/or type of conventional materials such as, for example, those utilized in industry standard rack mount cabinets. In the embodiment illustrated in FIG. 1A, the doors 14 are illustrated in a closed position. Additionally, although the mailbox 16 illustrated in FIG. 1A includes a plurality of mail slots 18, it is recognized that the mailbox 16 can alternatively be devoid of mail slots 18.

Figure 1B:
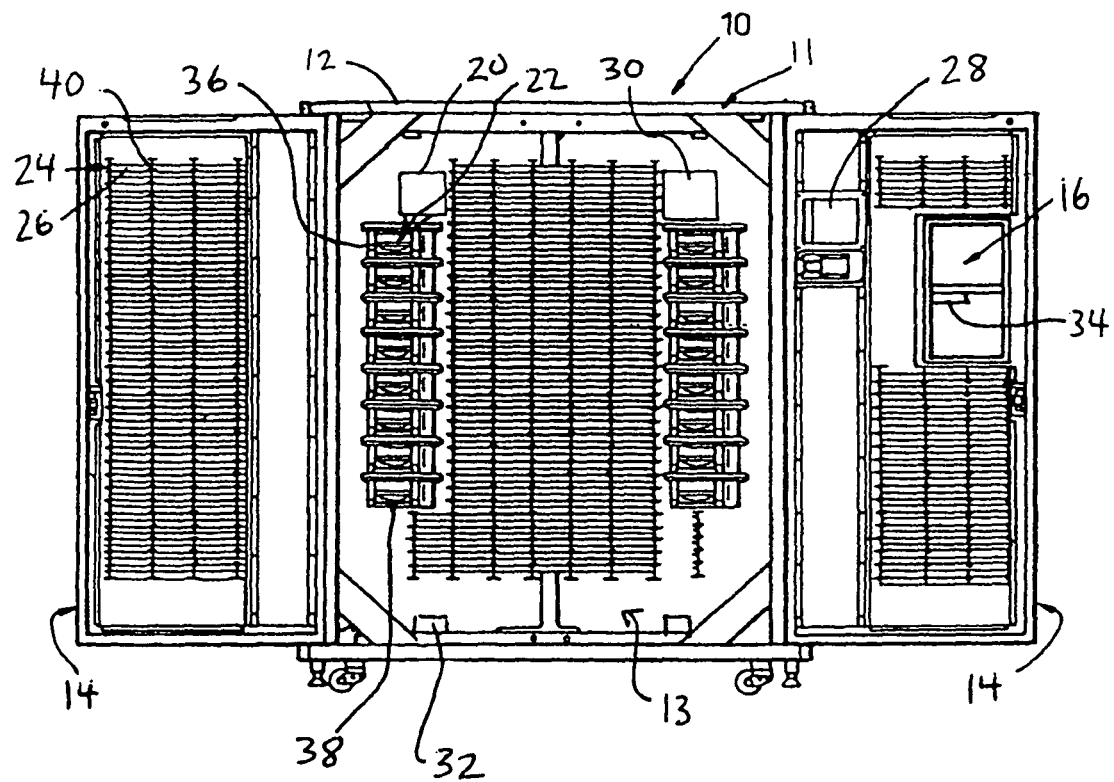
FIG. 1B is a simplified front elevation view of the media library illustrated in FIG. 1A, shown in an open position.

In the embodiment illustrated in FIG. 1B, the media library 11 is shown in an open position. In this embodiment, the media library 11 includes the housing 12, the doors 14, the mailbox 16, and an interior cavity 13 that includes a power supply 20, a plurality of tape drive assemblies 22, one or more cartridge retainers 24 that each can selectively retain a tape cartridge 26, a cartridge mover 28, and a controller 30. In one embodiment, the positioning and/or change in positioning of the doors 14 can be monitored. In one such embodiment, a door sensor 32 can transmit a signal to the controller 30, which can then be utilized by the controller 30 as more fully described below. Alternatively, the positioning and/or change in positioning of the door(s) 14 can be monitored by other mechanical and/or electrical structures.

Somewhat similarly, the positioning and/or change in positioning of the mailbox 14 can be monitored. In one embodiment, the mailbox 16 can alternately and selectively be in an open position or a closed position. In certain embodiments, a mailbox sensor 34 can transmit a signal to the controller 30, which can then be utilized by the controller 30 as more fully described below. Alternatively, the positioning and/or change in positioning of the mailbox 16 can be monitored by other mechanical and/or electrical structures.

In various embodiments, the power supply 20 can provide electrical power to the one or more of the tape drive assemblies 22, the cartridge mover 28 and the controller 30. The power supply 20 can be interfaced with these structures as well as with an external power source using industry standard cabling and connections (not shown).

As provided herein, each of the tape drive assemblies 22 can include a corresponding tape drive 36 (i.e. Quantum DLT 2000XT™, DLT4000™, DLT7000™, DLT8000™, DLT VS80™, DLT VS160™, DLT V-4™, DLT S4™, SDLT 320™, SDLT 600™, LTO-2™, LTG-2 HH™, LTO-™, LTO-3 HH™, DAT 72™, DDS-4™, or equivalent, as non-exclusive examples). The tape drive assemblies 22 within the media library 11 can be substantially identical to one another. Alternatively, one or more of the tape drive assemblies 22 within the media library 11 can be different from the remaining tape drive assemblies 22.

Each tape drive 36 receives one of a plurality of the tape cartridges 26, which are adapted for use in the media library 11. The tape drive 36 can include a cartridge drive sensor 38 that can generate a cartridge presence signal when the cartridge 26 is present within the tape drive 36. This signal from one tape drive 36 can be provided to the controller 30 and/or to another tape drive 36 in the same media library 11 or in a different media library 11.

In the embodiment illustrated in FIG. 1B, the cartridge mover 28 is positioned so that the cartridge mover can load and unload one of the cartridges 26 to and from all of the tape drives 36 and cartridge retainers 24 within a given media library 11. Further, the input of one or more cartridges 26 into the tape drive 36 can be automated, or it can be manually undertaken by an operator, for example. In one embodiment, one or more of the cartridge retainers 24 includes a retainer sensor 40 that can transmit a signal to the controller 30 so that the controller 30 can monitor the presence or absence of a cartridge 26 within a given cartridge retainer 24. This signal can then be utilized by the controller 30 as more fully described below. Alternatively, the positioning and/or change in positioning of the mailbox 16 can be monitored by other mechanical and/or electrical structures.

In the embodiment illustrated in FIG. 1B, the controller 30 is physically positioned remotely from the tape drives 36. In an alternative embodiment, the controller 30 can be incorporated into one or more of the tape drives 36. For example, the controller 30 can physically reside within or on one or more of the tape drives 36.

In one embodiment, the controller 30 can include a standard driver interface unit (not shown) for receiving digital commands and translating the commands into driving currents. Further, the controller 30 can include a standard programmable general purpose computer formed on a single plug-in card unit and preferably includes a programmed microprocessor or microcontroller according to the present invention, memory, communication interface, control interface, connectors, etc. The controller 30 can form part or all of the drive circuitry, which can include or comprise a printed circuit board assembly (not shown), in one non-exclusive example.

The media library 11 can use well-known industry standard cabling and communication protocols between the controller 30 and other structures of the media library 11. Cabling and electrical characteristics including signaling protocols can be generally standardized, and the logical message protocols can be either proprietary or standardized as known to those skilled in the art.

As an overview, as set forth in greater detail below, in certain embodiments, the controller 30 can determine a change in inventory of media cartridges within the media library 11. Further, the controller 30 can asynchronously report the specific change in inventory, as required.

Figure 2:
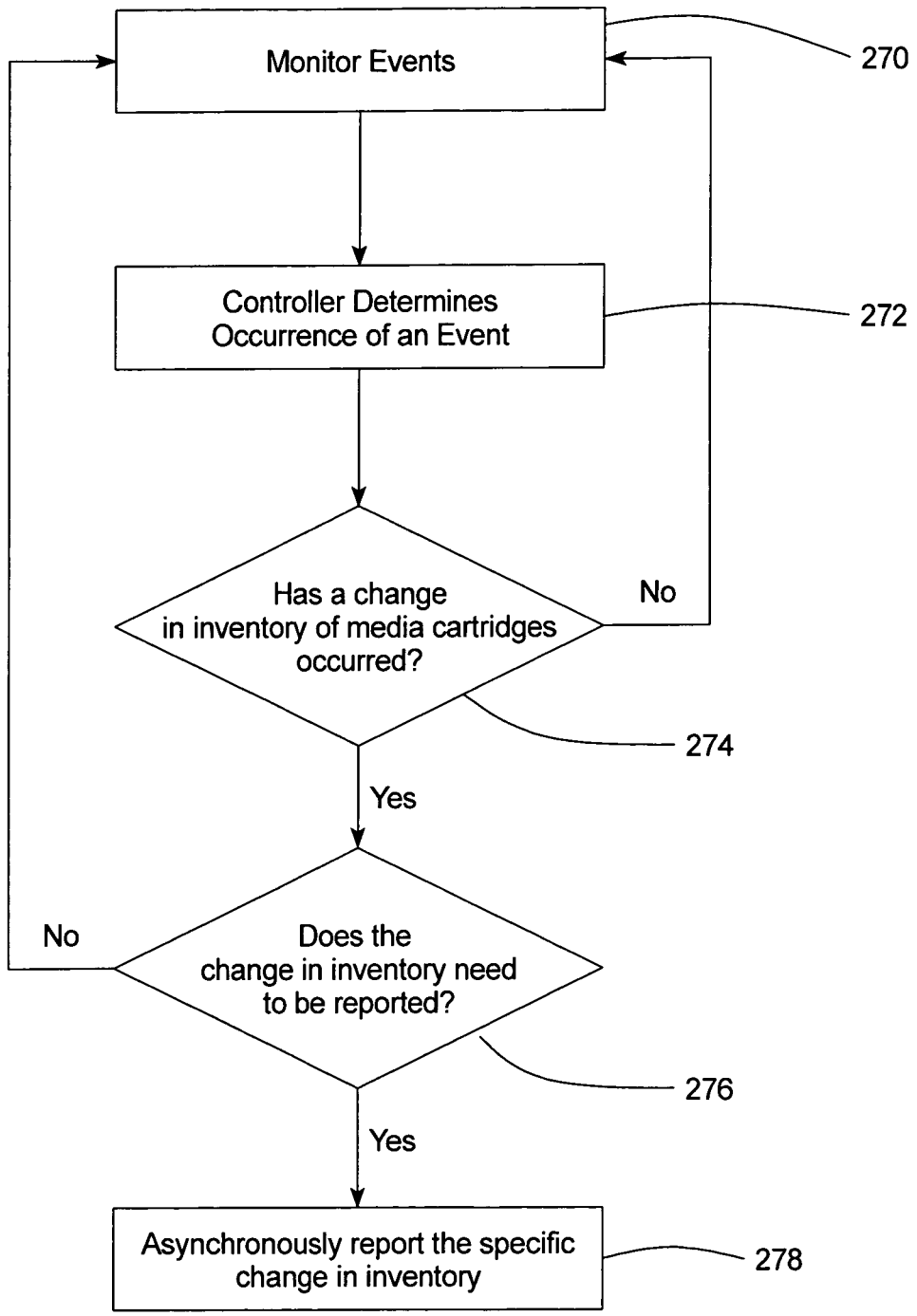
FIG. 2 is a flow chart of one embodiment of a method for monitoring changes in an inventory of media cartridges in the media library.

FIG. 2 is a flow chart of one embodiment of a method for monitoring changes in an inventory of media cartridges in the media library. In this embodiment, at step 270, the controller monitors one or more specific events, which can trigger initiation of an inventory scan within the media library. Non-exclusive examples of the types of events that can trigger initiation of an inventory scan can include opening, closing or otherwise repositioning of a door, opening, closing or otherwise repositioning of a mailbox, powering up of the media library or certain components within the media library, etc.

At step 272, upon detecting such an event, the controller can initiate an assessment of the media cartridge inventory within the media library. In certain embodiments, the controller can compare the current assessment of the media cartridge inventory with an assessment from a previous point in time, i.e. the next most recent assessment. In one embodiment, the assessment can be determined by scanning the media cartridges with a barcode scanner and compiling a list of media cartridges present within the media library system. This current list can then be compared with a previous list, and any differences can be noted. In non-exclusive alternative embodiments, presence sensors, imaging cameras or radio frequency-based detection methods (i.e. RFID or RF cartridge memory readers) can be utilized. In still an alternative embodiment, a combination of these or other suitable techniques can be used. In yet another embodiment, multiple techniques can be layered over one another to increase the accuracy of the list.

At step 274, the controller determines whether a change in the inventory of media cartridges has occurred, and if so, whether the change involved the addition or removal of a media cartridge. If no change has occurred, the controller again monitors events at step 270, and the process is re-initiated. In one embodiment, the controller monitors the status and/or location of the media cartridges within the media library by location to determine if the media cartridge moved within the library, was removed altogether from the inventory, or was added to the inventory.

At step 276, in the event a change in the inventory of the media cartridges is determined by the controller, the controller determines whether the change is required to be reported. The controller can be configured to report removal (or other movement) of a media cartridge based on one or more events. For example, in non-exclusive embodiments, events that can trigger the controller to report a change in the inventory can include removal of a media cartridge; removal of a media cartridge that is not placed in the mailbox by an application of the media library system; removal of a media cartridge from a cartridge media drive (or range of media drives or selected media drives); removal of a media cartridge from a cartridge retainer or other storage (or range of storage locations or selected storage locations) within the media library; removal of a media cartridge from a library partition (or range of partitions or selected partitions); removal of a media from a particular subset of media cartridges, such as a cartridge within a certain range of barcodes or selected barcodes, or from a selected region of the media library; removal of a media cartridge within a predetermined time range (e.g. between 6 p.m. and 8 a.m., or on weekends, etc.); removal of a media cartridge when unauthorized users are logged into the media library system or other systems that include the media library system; and/or removal of a media cartridge after a power off then power on, which can be indicative of a media cartridge that may have been removed while the media library was powered off. It is recognized that the above examples are not exclusive, and that the controller can be configured to report a change in inventory based on any suitable event as defined by the operator.

At step 278, the controller can report the change in inventory. In one embodiment, the controller can notify a management station or other suitable user or host via a simple network management protocol (SNMP) trap. As used herein, an SNMP trap is an unsolicited or asynchronous trap that can be sent to a network management system or to another manager of the media library system, for example. Once the SNMP trap is transmitted and received by the management system, an operator can further investigate the reported change in media cartridge inventory, as necessary.

In another embodiment, the controller can transmit an electronic mail notification to a network management system. In non-exclusive alternative embodiments, the controller can send an SMI-S indication, an alert on a user interface, or can activate an audible or visual alarm. Still alternatively, other suitable notification methods can be utilized by the controller. In one embodiment, one or more reporting mechanisms can be selected in conjunction with, or based on, one or more events.

For example, an administrator can configure notification via an SNMP trap for any media cartridge removal from the mailbox. However, the administrator can configure notification via all available reporting mechanisms for removal of a media cartridge from a media cartridge drive that occurs after hours. Alternatively, the administrator can configure notification via certain e-mail addresses for different events. It is understood that numerous permutations and combinations of reporting mechanisms based on information received by the controller relating to a change in media cartridge inventory are possible utilizing the media library system described herein, and that no limitations are intended by providing specific examples for purposes of understanding the scope and intent of the invention.

The notification by the controller can vary. For example, in non-exclusive embodiments, the notification can include the time of the detected change in inventory, the identity of the cartridge media that was removed or added, i.e. barcode label, serial number or other unique identifier, the identity of the library from which the cartridge media was removed, and/or the specific location from where the cartridge media was removed (or to where the cartridge media was added). The notification can include one or more media cartridges that were affected by the change in inventory, such as in the form of a list of cartridge media and other relevant information, as provided herein.

Figure 3:
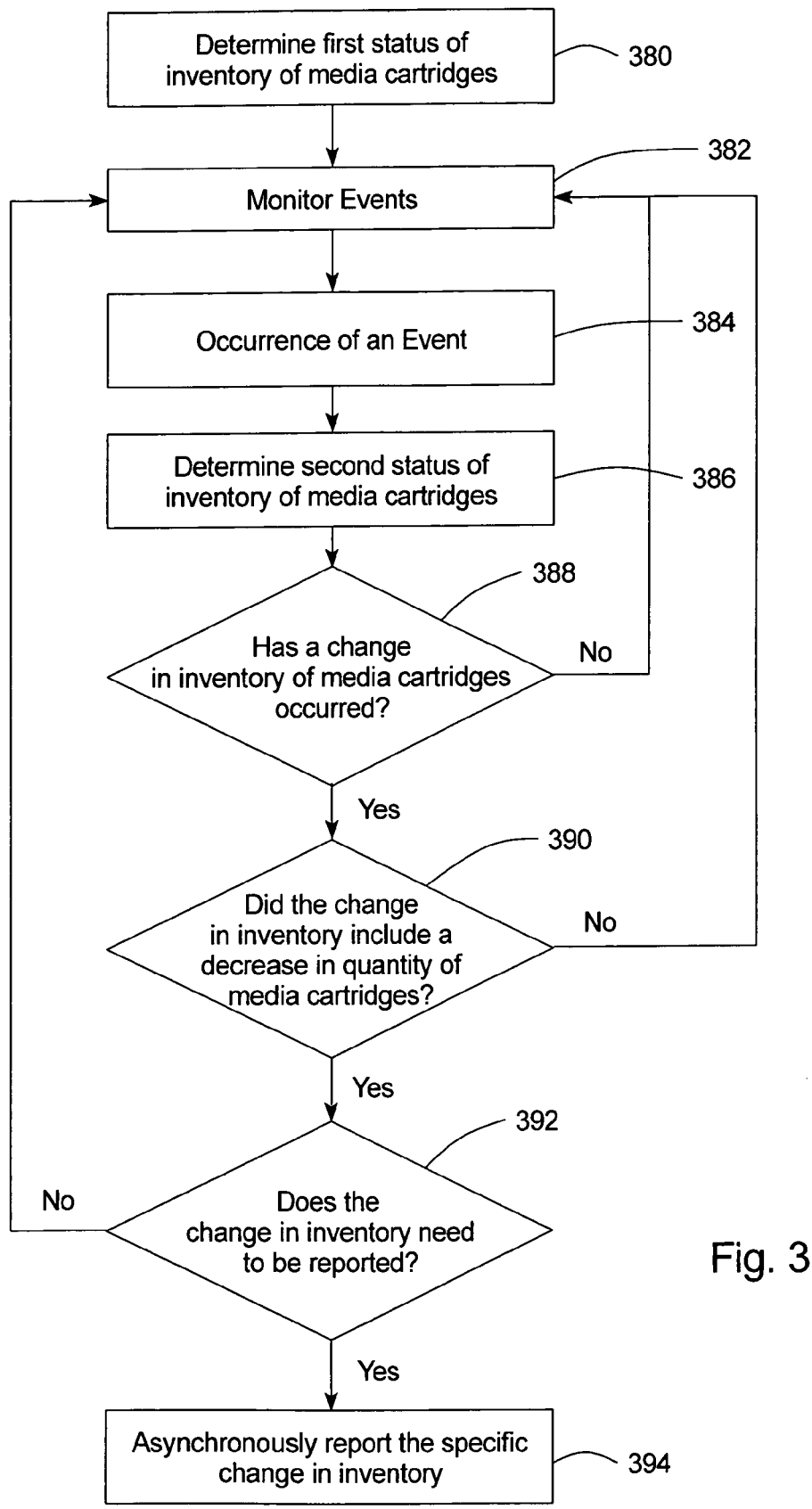
FIG. 3 is a flow chart of another embodiment of a method for monitoring changes in an inventory of media cartridges in the media library.

FIG. 3 is a flow chart of another embodiment of a method for monitoring changes in an inventory of media cartridges in the media library. In this embodiment, the method can include one or more of the following steps. At step 380, the controller can determine a first assessment of the inventory of the media cartridges at a first point in time.

At step 382, the controller can monitor the system for the occurrence of various events, as previously described herein.

At step 384, the controller can determine that an event has occurred, as provided above.

At step 386, the controller can determine a second assessment of the inventory of the media cartridges at a second point in time.

At step 388, the controller can compare the first assessment with the second assessment to determine whether a change in the inventory of media cartridges has occurred. If no change has occurred, the controller can monitor the system for the occurrence of various events, at step 382.

At step 390, the controller determines whether the change in inventory includes a decrease in the quantity of media cartridges. If the change in inventory of the media cartridges did not involve a decrease in the quantity of media cartridges, the controller can monitor the system for the occurrence of various events, at step 382. If the change in inventory of the media cartridges did involve a decrease in the quantity of media cartridges, the controller can then determine whether the change in inventory is required to be reported, at step 392.

In an alternative embodiment, at step 390, the controller can determine whether a change in a specific identifier of any of the cartridges occurred. In other words, the controller can determine whether one or more cartridges were swapped out for one or more different cartridges so that the overall quantity of cartridges does not change, but the specific cartridges present in the media library have changed. In one such embodiment, the controller can scan the barcode labels (or monitor some other type of media cartridge identifier) of the media cartridges in the media library to determine whether any changes in the media cartridge inventory have occurred. Once the controller determines whether the change in inventory resulted in one or more different media cartridge barcodes being present within the media library, the controller can then determine whether the change in inventory is required to be reported at step 392.

If the change in inventory is not required to be reported, the controller can monitor the system for the occurrence of various events, at step 382. If the change in inventory is required to be reported, at step 394, the controller can asynchronously report the specific change, or any relevant information regarding the change, as provided herein.

While the particular media library system 10 and media library 11 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for monitoring changes in an inventory of media cartridges within a media library, the method comprising the steps of:
    identifying with a controller a change in the inventory of media cartridges within the media library; and
    selectively reporting with the controller, in a manner that is asynchronous to the step of identifying, the change in inventory of media cartridges within the media library.

2. The method of claim 1 further comprising the step of determining whether the change in inventory included an increase or a decrease in the quantity of media cartridges within the media library.

3. The method of claim 1 further comprising the step of determining whether the change in inventory resulted in a change in one or more cartridge identifiers within the media library.

4. The method of claim 1 further comprising the step of determining whether the change in inventory of media cartridges is required to be reported.

5. The method of claim 4 wherein the step of determining whether the change in inventory is required to be reported includes bypassing reporting of a change in inventory if the change in inventory is initiated by a command to export or import one of the media cartridges.

6. The method of claim 4 wherein the step of determining whether the change in inventory is required to be reported includes reporting the change in inventory if the change in inventory is not initiated by a command to export or import one of the media cartridges.

7. The method of claim 4 wherein the step of determining whether the change in inventory is required to be reported includes reporting the change in inventory if the change in inventory occurs to a selected subset of media cartridges within the media library.

8. The method of claim 4 wherein the step of determining whether the change in inventory is required to be reported includes reporting the change in inventory if the change in inventory occurs during a predetermined period of time.

9. The method of claim 4 wherein the step of determining whether the change in inventory is required to be reported includes reporting the change in inventory if the change in inventory occurred while an unauthorized user is logged in to a system that at least partially controls the media library.

10. The method of claim 4 wherein the step of determining whether the change in inventory is required to be reported includes reporting the change in inventory if the change in inventory occurred following a power up of a system that at least partially controls the media library.

11. The method of claim 1 further comprising the step of assessing the inventory following the occurrence of an event.

12. The method of claim 11 wherein the event includes one of opening or closing of a mailbox of the media library.

13. The method of claim 11 wherein the event includes powering up of the media library.

14. The method of claim 11 wherein the event includes one of opening or closing of a door of the media library.

15. The method of claim 11 further comprising the step of comparing the inventory following the event with the inventory prior to the event.

16. The method of claim 1 wherein the step of asynchronously and selectively reporting includes the controller sending a simple network management protocol (SNMP) trap notification.

17. The method of claim 1 wherein the step of asynchronously and selectively reporting includes the controller sending an electronic mail notification.

18. The method of claim 1 wherein the step of asynchronously and selectively reporting includes the controller sending an SMI-S indication.

19. The method of claim 1 wherein the step of asynchronously and selectively reporting includes the controller reporting the change in inventory to a user interface.

20. The method of claim 1 wherein the step of asynchronously and selectively reporting includes reporting a time that the change in inventory in the media library was determined.

21. The method of claim 1 wherein the step of asynchronously and selectively reporting includes reporting a location of the change in inventory in the media library.

22. The method of claim 1 wherein the cpccific change in inventory includes reporting a unique identifier of one of the media cartridges.

23. The method of claim 22 wherein the unique identifier includes a barcode label.

24. The method of claim 1 further comprising the step of providing a user interface that includes options for configuring the reporting of the change in inventory of the media cartridges within the media library.

25. A method for monitoring changes in the presence of media within a media library, the method comprising the steps of:
    identifying with a controller a change in inventory of media cartridges within the media library;
    determining whether the change in inventory included an increase or a decrease in the quantity of media cartridges within the media library;
    determining whether the change in inventory is required to be reported; and
    reporting the change in inventory when reporting the change in inventory is determined to be required;
    wherein the step of reporting occurs asynchronously to the steps of identifying, determining whether the change in inventory included an increase or a decrease, and determining whether the change in inventory is required to be reported.

26. The method of claim 25 wherein the step of determining whether the change in inventory is required to be reported includes reporting the change in inventory if the change in inventory is not initiated by a command to export or import one of the media cartridges.

27. The method of claim 25 wherein the step of determining whether the change in inventory is required to be reported includes reporting the change in inventory if the change in inventory occurs to a selected subset of media cartridges within the media library.

28. The method of claim 25 wherein the step of determining whether the change in inventory is required to be reported includes reporting the change in inventory if the change in inventory occurs during a predetermined period of time.

29. The method of claim 25 wherein the step of determining whether the change in inventory is required to be reported includes reporting the change in inventory if the change in inventory occurred while an unauthorized user is logged in to a system that at least partially controls the media library.

30. The method of claim 25 wherein the step of determining whether the change in inventory is required to be reported includes reporting the change in inventory if the change in inventory occurred following a power up of a system that at least partially controls the media library.

31. The method of claim 25 further comprising the step of assessing the inventory following the occurrence of an event.

32. The method of claim 31 wherein the event is selected from the group consisting of opening or closing of a mailbox of the media library, powering up of the media library and opening or closing of a door of the media library.

33. The method of claim 25 further comprising the step of comparing the inventory following the event with the inventory prior to the event.

34. The method of claim 25 wherein the step of asynchronously reporting includes the controller sending a simple network management protocol (SNMP) trap notification.

35. The method of claim 25 wherein the step of asynchronously reporting includes reporting a time that the change in inventory in the media library was determined.

36. The method of claim 25 wherein the step of asynchronously reporting includes reporting a location of the change in inventory in the media library.

37. The method of claim 25 further comprising the step of providing a user interface that includes options for configuring the reporting of the change in inventory of the media cartridges within the media library.

38. A media library system comprising:
a media library including a plurality of media cartridges; and
a controller that identifies a change in an inventory of media cartridges within the media library, the controller selectively reporting the change in the inventory of media cartridges within the media library asynchronously with identifying the change in the inventory of media cartridges within the media library.

39. The media library system of claim 38 wherein the controller is configured to determine whether the change in inventory included an increase or a decrease in the quantity of media cartridges within the media library.

40. The media library system of claim 38 wherein the controller is configured to determine whether the change in inventory is required to be reported.

41. The media library system of claim 38 wherein the controller is configured to assess the inventory following the occurrence of an event.

42. The media library system of claim 41 wherein the event is selected from the group consisting of opening or closing of a mailbox of the media library, powering up of the media library and opening or closing of a door of the media library.

43. The media library system of claim 41 wherein the controller is configured to compare the inventory following the event with the inventory prior to the event.

44. The media library system of claim 41 wherein the controller is configured to send a simple network management protocol (SNMP) trap notification.

45. The media library system of claim 38 further comprising a user interface that allows configuring of the reporting of the change in inventory of the media cartridges within the media library.

* * * * *